United States Patent [19]
Chatterji et al.

[11] Patent Number: 5,875,844
[45] Date of Patent: Mar. 2, 1999

[54] METHODS OF SEALING PIPE STRINGS IN WELL BORES

[75] Inventors: Jiten Chatterji; David D. Onan, both of Duncan; Roger S. Cromwell, Walters; Bobby J. King; Patty L. Onan, both of Duncan, all of Okla.

[73] Assignee: Halliburton Energy Services, Inc., Duncan, Okla.

[21] Appl. No.: 31,136

[22] Filed: Feb. 26, 1998

Related U.S. Application Data

[63] Continuation-in-part of Ser. No. 914,594, Aug. 18, 1997.
[51] Int. Cl.$^6$ .................................................. E21B 33/14
[52] U.S. Cl. ......................... 166/293; 166/295; 166/300; 405/264
[58] Field of Search ........................ 166/285, 292–295, 166/300; 405/264

[56] References Cited

U.S. PATENT DOCUMENTS

| | | | |
|---|---|---|---|
| 3,082,823 | 3/1963 | Hower | 166/29 |
| 3,467,208 | 9/1969 | Kelly | 175/72 |
| 3,960,801 | 6/1976 | Cole et al. | 260/33.6 EP |
| 3,976,135 | 8/1976 | Anderson | 166/276 |
| 4,072,194 | 2/1978 | Cole et al. | 166/295 |
| 4,215,001 | 7/1980 | Elphingstone et al. | 252/8.55 C |
| 4,272,384 | 6/1981 | Martin | 252/8.55 R |
| 4,336,842 | 6/1982 | Graham et al. | 166/276 |
| 4,483,888 | 11/1984 | Wu | 427/336 |
| 4,489,785 | 12/1984 | Cole | 166/295 |
| 4,665,988 | 5/1987 | Murphey et al. | 166/295 |
| 4,741,401 | 5/1988 | Walles et al. | 166/300 |
| 4,785,884 | 11/1988 | Armbruster | 166/280 |
| 5,159,980 | 11/1992 | Onan et al. | 166/294 |
| 5,168,928 | 12/1992 | Terry et al. | 166/292 |
| 5,293,938 | 3/1994 | Onan et al. | 166/293 |
| 5,325,723 | 7/1994 | Meadows et al. | 73/794 |
| 5,335,726 | 8/1994 | Rodrigues | 166/295 |
| 5,337,824 | 8/1994 | Cowan | 166/293 |
| 5,358,044 | 10/1994 | Hale et al. | 166/293 |
| 5,358,051 | 10/1994 | Rodrigues | 166/295 |
| 5,361,841 | 11/1994 | Hale et al. | 166/293 |
| 5,361,842 | 11/1994 | Hale et al. | 166/293 |
| 5,373,901 | 12/1994 | Norman et al. | 166/300 |
| 5,377,757 | 1/1995 | Ng | 166/277 |
| 5,547,027 | 8/1996 | Chan et al. | 166/295 |

FOREIGN PATENT DOCUMENTS

| | | | |
|---|---|---|---|
| WO 91/02703 | 7/1991 | WIPO | C04B 24/24 |
| WO 94/12445 | 9/1994 | WIPO | C04B 26/18 |

*Primary Examiner*—Roger Schoeppel
*Attorney, Agent, or Firm*—Craig W. Roddy; C. Clark Dougherty, Jr.

[57] ABSTRACT

The present invention provides improved methods of sealing a string of pipe in a well bore. The methods basically include the steps of preparing a hardenable epoxy sealing composition which hardens into a solid mass having flexibility and resiliency comprising an epoxide containing liquid and a hardening agent, placing the epoxy composition in the annulus between the string of pipe and the walls of the well bore and allowing the epoxy resin to harden.

34 Claims, No Drawings

METHODS OF SEALING PIPE STRINGS IN WELL BORES

This application is a continuation-in-part of application Ser. No. 08/914,594 filed on Aug. 18, 1997.

BACKGROUND OF THE INVENTION

1. Field of the Invention

The present invention relates generally to improved methods of sealing pipe strings in well bores, and more particularly, to methods of sealing pipe strings in well bores with corrosion resistant highly resilient epoxy compositions.

2. Description of the Prior Art

Hydraulic cement compositions are commonly utilized as sealants in subterranean well construction and repair procedures. For example, hydraulic cement compositions are used in primary sealing operations whereby strings of pipe such as casing and liners are sealed in well bores. In performing primary cementing, a hydraulic cement composition is pumped into the annular space between the walls of the well bore and the exterior surfaces of pipe disposed therein. The cement composition is permitted to set in the annular space thereby forming an annular sheath of hardened substantially impermeable cement therein. The cement sheath supports and positions the pipe in the well bore and bonds the exterior surfaces of the pipe to the walls of the well bore whereby the undesirable migration of fluids between zones or formations penetrated by the well bore is prevented.

When conventional cement compositions are utilized for sealing pipe strings in well bores, they set into brittle solid masses. Consequently, the solid cement often does not have sufficient flexibility and resiliency to resist loss of pipe and/or formation bond, cracking or shattering as the result of pipe movements caused by expansion, contraction, impacts or shocks. The bond loss, cracking or shattering of the set cement allows leakage of formation fluids through at least portions of the well bore by way of the annulus therein which can be highly detrimental.

Hardenable epoxy resin compositions have heretofore been used for sealing pipe strings in well bores which penetrate subterranean zones containing corrosive fluids. For example, waste fluids such as salt water, acidic materials, caustic materials, organic materials, chemical by-product materials and the like are often disposed of by injecting them into disposal wells. Such disposal wells penetrate subterranean formations which accept large volumes of waste and are naturally separated from other subterranean formations. When a disposal well or other well where hydrocarbons are produced along with corrosive fluids is completed in the conventional manner whereby a string of steel pipe is cemented in the well bore utilizing a hydraulic cement slurry, both the cement and steel pipe are often subjected to severe corrosion. A result of such corrosion in disposal wells can be that the liquid waste materials leak into and contaminate formations containing useful fluids such as hydrocarbons or potable water. In other wells where hydrocarbons are produced with corrosive fluids, the corrosion can result in leakage of fluids between formations and/or to the surface.

In order to prevent the corrosion of metal pipe strings, it has heretofore been the practice to seal the pipe strings in well bores with a hardenable epoxy resin composition. Epoxy resin compositions are highly resistant to degradation by acids and other corrosive fluids and their use ensures that the corrosive fluids do not find their way to the surface or into subterranean locations containing useful recoverable fluids. However, like set cement compositions, hardened epoxy resin compositions have often lacked sufficient flexibility and resiliency to resist failure as a result of pipe movements.

Thus, there are needs for improved methods of sealing pipe strings in well bores whereby the sealant can withstand the effects of contact with corrosive fluids and/or pipe movements.

SUMMARY OF THE INVENTION

The present invention provides improved methods of sealing a string of pipe in a well bore using an epoxy sealant which upon hardening can withstand the effects of contact with corrosive fluids and/or pipe movements. The methods basically comprise the steps of preparing a hardenable epoxy sealing composition which hardens into a solid mass having flexibility and resiliency comprising an epoxy resin or an epoxide containing liquid, or both, and at least one hardening agent, placing the epoxy composition into the annulus between the string of pipe and the walls of the well bore and allowing the epoxy composition to harden.

The epoxy composition preferably includes a filler such as crystalline silica and the like. It can also be dispersed in water and/or foamed in the presence of a foaming agent and foam stabilizer with a compressible gas such as air or nitrogen.

It is, therefore, a general object of the present invention to provide improved methods of sealing pipe strings in well bores.

Other and further objects, features and advantages of the present invention will be apparent to those skilled in the art upon a reading of the description of preferred embodiments which follows.

DESCRIPTION OF PREFERRED EMBODIMENTS

The present invention provides improved methods of sealing pipe strings in well bores whereby the hardened sealant can withstand the effects of contact with corrosive fluids and/or pipe movements. The sealant compositions which are useful in accordance with the present invention are epoxy compositions basically comprised of an epoxy resin or an epoxide containing liquid, or both, and at least one hardening agent. In accordance with the methods, such an epoxy composition is prepared, placed in the annulus between a pipe string and the walls of a well bore and allowed to harden therein.

While various epoxy resins can be utilized, preferred such resins are those selected from the condensation products of epichlorohydrin and bisphenol A. A particularly suitable such resin is commercially available from the Shell Chemical Company under the trade designation "EPON®RESIN 828". This epoxy resin has a molecular weight of about 340 and a one gram equivalent of epoxide per about 180 to about 195 grams of resin. Another preferred epoxy resin is a condensation product of epichlorohydrin and bisphenol A which is pre-dispersed in a non-ionic aqueous fluid and is commercially available from the Shell Chemical Company under the trade designation "EPI-REZ®-3510-W-60". This epoxy resin has a molecular weight of about 340 and a one gram equivalent of epoxide per about 195 grams of resin. Another preferred epoxy resin is an epoxidized bisphenol A novalac resin which is pre-dispersed in a non-ionic aqueous fluid and is commercially available from the Shell Chemical Company under the trade designation "EPI-REZ®-5003-W-

55". This epoxy resin has a one gram equivalent of epoxide per about 205 grams of resin.

As indicated, a low viscosity epoxide containing liquid can also be utilized to modify the viscosity of the epoxy resin used and to add flexibility and resiliency to the epoxy composition after hardening. Also, an epoxide containing liquid can be utilized by itself as the only epoxide source in an epoxy composition of this invention. While various epoxide containing liquids can be used, preferred such liquids are butyl glycidyl ether, aliphatic epoxy esters, the diglycidyl ether of 1,4-butanediol, the diglycidyl ether of neopentyl glycol and the diglycidol ether of cyclohexane dimethanol. A suitable epoxide containing liquid comprised of butyl glycidyl ether is commercially available from the Shell Chemical Company of Houston Texas under the trade name "HELOXY®61". This epoxide containing liquid has a viscosity at 25° C. in the range of from about 1 to about 5 centipoises, a molecular weight of 130 and a one gram equivalent of epoxide per about 150 grams of the liquid. A suitable epoxide containing liquid comprised of an aliphatic epoxy ester is commercially available from the Shell Chemical Company under the trade name "HELOXY®71". This epoxide containing liquid has a viscosity at 25° C. in the range of from about 0.5 to about 9 centipoises and a one gram equivalent of epoxide per about 430 grams of the liquid. A suitable epoxide containing liquid comprised of the diglycidyl ether of 1,4-butanediol is commercially available from the Shell Chemical Company under the trade name "HELOXY®67". This epoxide containing liquid has a viscosity at 25° C. in the range of from about 13 to about 18 centipoises, a molecular weight of 202 and a one gram equivalent of epoxide per about 120 to about 130 grams of the liquid. A suitable diglycidyl ether of neopentylglycol is commercially available from Shell Chemical Company under the trade name "HELOXY®68". This epoxide containing liquid has a viscosity at 25° C. in the range of from about 13 to about 18 centipoises, a molecular weight of 216 and a one gram equivalent of epoxide per about 130 to about 140 grams of the liquid. A suitable diglycidyl ether of cyclohexane dimethanol is commercially available from Shell Chemical Company under the trade name "HELOXY®107". This epoxide containing liquid has a viscosity at 25° C. in the range of from about 55 to about 75 centipoises, a molecular weight of 256 and a one gram equivalent of epoxide per about 155 to about 165 grams of the liquid.

When an epoxide containing liquid is included in the epoxy composition to modify the viscosity of an epoxy resin therein and to add flexibility and resiliency to the epoxy composition, the epoxide containing liquid is present in an amount in the range of from about 10% to about 90% by weight of epoxy resin in the composition.

A variety of hardening agents, including, but not limited to, aliphatic amines, aliphatic tertiary amines, aromatic amines, cycloaliphatic amines, heterocyclic amines, amidoamines, polyamides, polyethylamines and carboxylic acid anhydrides can be utilized with the above described epoxy resins and/or epoxide containing liquids. Of these, aliphatic amines, aromatic amines and carboxylic acid anhydrides are the most suitable.

Examples of aliphatic and aromatic amine hardening agents are triethylenetetraamine, ethylenediamine, N-cocoalkyltrimethylenediamine, isophoronediamine, diethyltoluenediamine, and tris(dimethylaminomethylphenol). Examples of suitable carboxylic acid anhydrides are methyltetrahydrophthalic anhydride, hexahydrophthalic anhydride, maleic anhydride, polyazelaic polyanhydride and phthalic anhydride. Of these, triethylenetetraamine, ethylenediamine, N-cocoalkyltrimethylenediamine, isophoronediamine, diethyltoluenediamine and tris(dimethylaminomethylphenol) are preferred, with isophoronediamine, diethyletoluenediamine and tris(dimethylaminomethylphenol) being the most preferred.

The hardening agent or agents utilized are included in the epoxy composition in an amount in the range of from about 20% to about 90% by weight of the composition.

As mentioned above, the epoxy composition preferably includes a particulate filler such as crystalline silicas, amorphous silicas, clays, iron oxide, calcium carbonate or barite. When such a filler is utilized, it is generally present in the epoxy composition in an amount in the range of from about 10% to about 300% by weight of the composition.

The epoxy compositions can also be foamed either by themselves or when they are dispersed in water. The gas used to foam the epoxy composition is preferably nitrogen or air, with nitrogen being the most preferred. Generally, the gas is present in an amount sufficient to foam the epoxy composition and produce a slurry density in the range of from about 6 to about 16 pounds per gallon.

In order to facilitate foaming and to stabilize the foamed epoxy composition, a foaming agent is preferably included in the cement composition. While various foaming agents can be utilized, those which have been found to be particularly suitable include, but are not limited to, foaming agents comprising alcohol ether sulfates of the formula

$$H(CH_2)_a(OC_2H_4)_bOSO_3X$$

wherein a is an integer in the range of from about 5 to about 15, b is an integer in the range of from about 1 to about 10 and X is sodium or ammonium. Such a foaming agent is commercially available from Halliburton Energy Services under the tradename "HOWCO SUDS™". Another suitable foaming agent is comprised of the sodium salts of alpha-olefinic sulfonic acids having the formula

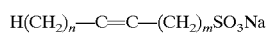

$$H(CH_2)_n-C=C-(CH_2)_mSO_3Na$$

wherein n and m are individually integers in the range of from about 6 to about 16. Such a foaming agent is commercially available from Halliburton Energy Services under the tradename "AQF-2™". A foaming agent which also functions as a hardening agent that can be utilized with an epoxidized bisphenol A novalac resin dispersed in water is comprised of N-coco-1,3-diaminopropane. Such a foaming and hardening agent is commercially available from the Akzo Nobel Company of Chicago, Illinois under the tradename "DUOMEEN®C". Generally, the foaming agent utilized is included in an epoxy composition of this invention in an amount in the range of from about 1% to 5% by weight of the epoxy composition.

A foam stabilizing agent can also be included in the epoxy compositions to enhance the stability of the foamed epoxy compositions. While a variety of foam stabilizers can be used, particularly suitable foam stabilizers are comprised of amidopropylbetaines having the formula

$$R-CONHCH_2CH_2CH_2N^+(CH_3)_2CH_2CO_2^-$$

wherein R is a $C_{10}$ to $C_{18}$ saturated aliphatic hydrocarbon group or an oleyl group or a linoleyl group. A particularly preferred foam stabilizing agent of the above type is an amidopropylbetaine of the above formula wherein R is a coco radical. Such a foam stabilizing agent is commercially available from Halliburton Energy Services under the tradename "HC-2™". When a foam stabilizing agent is utilized, it is generally included in an epoxy composition of this invention in an amount in the range of from about 0.5% to about 3% by weight of the epoxy composition.

A preferred method of this invention for sealing a string of pipe in a well bore comprises the following steps. A hardenable epoxy sealing composition is prepared which hardens into a solid mass having flexibility and resiliency. The epoxy composition is basically comprised of an epoxy resin or an epoxide containing liquid, or both, of the types described above and at least one hardening agent of the type described above. After the epoxy composition has been prepared, it is placed into the annulus between a string of pipe and the walls of a well bore and the epoxy composition is allowed to harden therein. The epoxy composition also preferably includes a particulate filler of the type described above.

Another preferred method of this invention comprises the steps of preparing a foamed hardenable epoxy sealing composition which hardens into a solid mass having flexibility and resiliency comprising water, an epoxy resin or an epoxide containing liquid, or both, of the types described above, at least one hardening agent of the type described above and a compressible gas, preferably nitrogen. The epoxy composition also preferably includes an effective amount of a foaming agent and an effective amount of a foam stabilizer as well as a particulate filler of the types described above.

Yet another preferred method comprises the steps of preparing a foamed hardenable epoxy sealing composition which hardens into a solid mass having flexibility and resiliency comprising an epoxy resin or an epoxide containing liquid, or both, of the types described above, at least one hardening agent of the type described above and a compressible gas, preferably nitrogen. The epoxy composition also preferably includes an effective amount of a foaming agent and an effective amount of a foam stabilizer as well as a particulate filler of the types described above.

In order to further illustrate the methods and epoxy compositions of this invention, the following example is given.

EXAMPLE 1

A number of non-foamed epoxy sealant compositions useful in accordance with this invention were prepared containing the components and in the amounts shown in Table I below. The compositions were tested for thickening times, compressive strengths, shear bond strengths and tensile strengths in accordance with the procedures set forth in *API Specification For Materials And Testing For Well Cements*, API Specification 10, 5th Edition, dated Jul. 1, 1990 of the American Petroleum Institute. The results of these tests are set forth in Table I below:

TABLE I

NON-FOAMED EPOXY SEALANT COMPOSITION PROPERTIES

| Sealant Composition Components | | | | | | Thickening Time | | | | | | | | | | | |
|---|---|---|---|---|---|---|---|---|---|---|---|---|---|---|---|---|---|
| Epoxide Containing Liquid | Quantity, Grams | Hardening Agent | Quantity, Grams | Filler | Quantity, Grams | Density, lbs/gal | To 100 Bc, hr:min | | | Compressive Strength, psi | | | Shear Bond[5] Strength, psi | | | Tensile Strength[6], psi | | |
| | | | | | | | 100° F. | 150° F. | 200° F. | 100° F. | 150° F. | 190° F. | 140° F. | 240° F. | 280° F. | 140° F. | 240° F. | 280° F. |
| Diglycidal Ether of 1,4-Butendiol[1] | 400 | Diethyltoluenediamine[2] | 132 | Microsand | 800 | 13.35 | — | 10:45 | 3:45 | — | 10,300 (72 hrs) | 7,800 (24 hrs) | — | — | 103 | — | — | 176 |
| Diglycidal Ether of 1,4-Butandiol[1] | 400 | Diethyltoluenediamine[2,3] | 132 | Microsand | 800 | 13.26 | — | 4:00 | — | — | 3,610 (24 hrs) | — | — | 101 | — | — | 246 | — |
| Diglycidal Ether of 1,4-Butandiol[1] | 400 | Isophronediamine[4] | 130 | Microsand | 800 | 13.17 | 2:15 | — | — | 6,033 (24 hrs) | — | — | 255 | — | — | 1832 | — | — |

[1]"HELOXY ® 67" from Shell Chemmical Co.
[2]"EPI-CURE ® (R)W" from Shell Chemical Co.
[3]Composition also included 15 grams of "EPI-CURE ®" 3253 catalyst tris(dimethylaminomethylphenol) from Shell Chemical Co.
[4]"Vestamine ® IPD" from Hulls of America, Inc.
[5]Average of three cylinders cured at temperature for 72 hrs.
[6]Average of three cubes cured at temperature for 72 hrs.

From Table I, it can be seen that the epoxy sealant compositions have excellent sealing properties.

EXAMPLE 2

An epoxy sealant composition was prepared comprised of 600 grams of diglycidyl ether of cyclohexane dimethanol ("Heloxy® 107" from Shell Chemical Company), 600 grams of microsand and 140 grams of diethyltoluenediamine ("EPI-CURE®(R)W" from Shell Chemical Company). The epoxy sealant composition was allowed to harden in a cylinder for 24 hours at 250° F. The weight of the resulting hardened cylindrical composition was determined to be 272.36 grams. The cured composition was then submerged in crude oil in an autoclave at 250° F. for 72 hours. At the end of the 72 hours, the composition was rinsed with acetone and it was again weighed. The weight was determined to be 272.68 grams. Thus, the hardened epoxy sealant composition was not dissolved or otherwise weakened by prolonged contact with hot crude oil.

EXAMPLE 3

A number of additional non-foamed and foamed epoxy sealant compositions were prepared containing the components and in the amounts shown in Table II below. The non-foamed compositions in Table II are Compositions Nos. 1, 3, 5 and 7 with the foamed compositions being Nos. 2, 4, 6 and 8.

The compositions were tested for thickening times, compressive strengths and air permeabilities in accordance with the procedures set forth in *API Specification For Materials And Testing For Well Cements*, API Specification 10, 5th edition, dated Jul. 1, 1990 of the American Petroleum Institute. Tensile strength tests were also conducted using specimens of the hardened compositions prepared in briquette molds in accordance with the test procedures of the American Society for Testing and Materials as set forth in ASTM 307. The specimens have the appearance of a dog biscuit with the middle portion measuring about 1 square inch in cross-section. The tensile break normally occurs at the middle portion when tension is applied at the enlarged ends of the specimen, and the tension applied is equal to the tensile strength of the specimen. However, when testing the hardened epoxy compositions of this invention, an actual break did not occur. Instead, the larger ends of the specimen held by the holding slips described in ASTM 307 deformed and allowed the specimen to be pulled from the holding slips. The indicated tensile strength is therefor the force required to deform the specimen.

The foamed compositions were prepared at atmospheric pressure in accordance with the following procedure. An unfoamed base composition was mixed. The foaming agent and foam stabilizing agent used were added to a weight of the unfoamed composition calculated from the volume of a special sealable multi-blend mixing container wherein the composition was foamed with air by mixing action. The foamed density was determined by pouring the foamed composition into a container of known volume, measuring the weight to fill the container and calculating the density of the foamed composition based on the volume and weight. Portions of the base epoxy compositions and the foamed compositions were tested as indicated above. The results of the tests are also set forth in Table III below.

TABLE II

NON-FOAMED AND FOAMED EPOXY SEALANT COMPOSITIONS

| Comp. No. | Epoxy Resin Used | Quantity, Grams | Epoxide Containing Liquid Used | Quantity, Grams | First Hardening Agent Used | Quantity, Grams | Second Hardening Agent Used | Quantity, Grams | Foaming Agent Used | Quantity, Grams | Foam Stabilizer Used | Quantity, Grams | Filler[8], Grams |
|---|---|---|---|---|---|---|---|---|---|---|---|---|---|
| 1 | None | — | Diglycidyl Ether of Cyclohexane Dimethanol[1] | 400 | Diethyl-toluenediamine[2] | 112 | tris(dimethyl-aminoethyl-phenol)[3] | 10 | None | — | None | — | 600 |
| 2 | None | — | Diglycidyl Ether of Cyclohexane Dimethanol[1] | 400 | Diethyl-toluenediamine[2] | 112 | tris(dimethyl-aminoethyl-phenol)[3] | 10 | Sodium salt of α-olefinic sulfonic acid | 10 | coco-amido-propyl-betaine | 5 | 600 |
| 3 | None | — | Diglycidyl Ether of 1,4-butanediol[4] | 400 | Diethyl-toluenediamine[2] | 132 | tris(dimethyl-aminoethyl-phenol)[3] | 10 | None | — | None | — | 600 |
| 4 | None | — | Diglycidyl Ether of 1,4-butanediol[4] | 400 | Diethyl-toluenediamino[2] | 132 | tris(dimethyl-aminoethyl-phenol)[3] | 10 | Sodium salt of α-olefinic sulfonic acid | 10 | coco-amido-propyl-betaine | 5 | 600 |
| 5 | Aqueous dispersion of an epoxidized bisphenol A novalac resin[5] | 400 | None | — | Iso-phorone-diamine[6] | 42 | None | — | None | — | None | — | 200 |
| 6 | Aqueous dispersion of an epoxidized bisphenol A novalac resin[5] | 400 | None | — | N-coco-1,3-diamino-propane[7] (hardening agent and foaming agent) | 155 | None | — | None | — | None | — | 100 |
| 7 | Aqueous dispersion | 400 | None | — | Diethyl-toluene- | 70 | tris(dimethyl- | 10 | None | — | None | — | 250 |

TABLE II-continued

NON-FOAMED AND FOAMED EPOXY SEALANT COMPOSITIONS

| Comp. No. | Epoxy Resin Used | Quantity, Grams | Epoxide Containing Liquid Used | Quantity, Grams | First Hardening Agent Used | Quantity, Grams | Second Hardening Agent Used | Quantity, Grams | Foaming Agent Used | Quantity, Grams | Foam Stabilizer Used | Quantity, Grams | Filler[8], Grams |
|---|---|---|---|---|---|---|---|---|---|---|---|---|---|
| | of a condensation product of epichlorohydrin and bisphenol A[9] | | | | diamine[2] | | aminoethylphenol)[3] | | | | | | |
| 8 | Aqueous dispersion of a condensation product of epichlorohydrin and bisphenol A[9] | 500 | None | — | Isophoronediamine[6] | 84 | None | — | (HOWCO SUDS) | 10 | Cocoamidopropylbetaine | 5 | 368 |

[1]"HELOXY ® 107" from Shell Chemical Co.
[2]"EPI-CURE ® W" from Shell Chemical Co.
[3]"EPI-CURE ® 3253" from Shell Chemical Co.
[4]"HELOXY ® 67" from Shell Chemical Co.
[5]"EPI-REZ ® "-5003-W-55 from Shell Chemical Co.
[6]"VESTAMINE ® IPD" from Hulls of America, Inc.
[7]"DUO-MEEN ® C" from Akzo Nobel.
[8]Microsand.
[9]"EPI-REZ ®-3510-W-60 from Shell Chemical Co.

TABLE III

TEST RESULTS

| Comp. No. | Density, lb/gal | Thickening Time to 100 BC @ 140° F., hr:min | Compressive Strength - 72 hrs @ 140° F., psi | Tensile Strength - 72 hrs @ 140° F., psi | Air Permeability, md | Foamed, Yes or No |
|---|---|---|---|---|---|---|
| 1 | 13.6 | 2:00 | 15,970 | 3600 | 0.001 | No |
| 2 | 11.5 | 1:45 | 11,100 | 1787 | 0.001 | Yes |
| 3 | 13.5 | 7:00 | 10,490 | 781 | 0.001 | No |
| 4 | 11.5 | 3:10 | 2,600 | 273 | 0.001 | Yes |
| 5 | 10.5 | 0:15 | 1086 | 261 | 8.77 | No |
| 6 | 8 | — | 440 | 90 | 0.001 | Yes |
| 7 | 10 | 1:30 | 2420 | 697 | 30.79 | No |
| 8 | 8.9 | 0:15 | 2195 | 678 | 86.88 | Yes |

From the results of Table III it can be seen that the non-foamed and foamed epoxy sealant compositions also have excellent sealing properties.

Thus, the present invention is well adapted to carry out the objects and attain the features and advantages mentioned as well as those which are inherent therein. While numerous changes may be made by those skilled in the art, such changes are encompassed within the spirit of this invention as defined by the appended claims.

What is claimed is:

1. An improved method of sealing a string of pipe in a well bore comprising the steps of:
   (a) preparing a hardenable epoxy sealing composition which hardens into a solid mass having flexibility and resiliency comprising an epoxide containing liquid and a hardening agent;
   (b) placing said epoxy composition into the annulus between said string of pipe and the walls of said well bore; and
   (c) allowing said epoxy composition to harden.

2. The method of claim 1 wherein said epoxide containing liquid is selected from the group of butyl glycidyl ether, aliphatic epoxy esters, the diglycidyl ether of neopentyl glycol and the diglycidyl ether of cyclohexane dimethanol.

3. The method of claim 1 wherein said hardening agent is at least one member selected from the group of aliphatic amines, aromatic amines and carboxylic acid anhydrides.

4. The method of claim 1 wherein said hardening agent is at least one member selected from the group of triethylenetetraamine, ethylenediamine, N-cocoalykyltrimethylenediamine, isophoronediamine, diethyltoluenediamine and tris (dimethylaminomethylphenol) and is present in said composition in an amount in the range of from about 20% to about 90% by weight of said composition.

5. The method of claim 1 wherein said epoxy composition further comprises a particulate filler.

6. The method of claim 5 wherein said filler is selected from the group consisting of crystalline silicas, amorphous silicas, clays, iron oxide, calcium carbonate and barite.

7. The method of claim 1 wherein said epoxy composition is dispersed in water.

8. The method of claim 7 wherein said epoxy composition further comprises:
an effective amount of a foaming agent;
an effective amount of a foam stabilizer; and
a compressible gas present in an amount sufficient to foam said composition.

9. The method of claim 8 wherein said foaming agent is selected from the group of a foaming agent comprising an alcohol ether sulfate, a foaming agent comprising the sodium salt of an alpha-olefinic sulfonic acid and a foaming agent comprising N-coco-1,3-diaminopropane and is present in an amount in the range of from about 1% to about 5% by weight of said epoxy composition.

10. The method of claim 8 wherein said foam stabilizer is selected from the group of amidopropylbetaines having the formula

wherein R is a $C_{10}$ to $C_{18}$ saturated aliphatic hydrocarbon group or an oleyl group or a linoleyl group and is present in an amount in the range of from about 0.5% to about 3% by weight of said epoxy composition.

11. The method of claim 8 wherein said compressible gas is selected from the group of air and nitrogen.

12. The method of claim 1 wherein said epoxy composition further comprises an epoxy resin selected from the group of the condensation products of epichlorohydrin and bisphenol A and epoxidized bisphenol A novalac resin.

13. An improved method of sealing a string of pipe in a well bore whereby the sealant can withstand the effects of contact with corrosive fluids and pipe movements comprising the steps of:
(a) preparing a foamed hardenable epoxy sealing composition which hardens into a solid mass having flexibility and resiliency comprising an epoxide containing liquid, a hardening agent and a compressible gas;
(b) placing said epoxy composition into the annulus between said string of pipe and the walls of said well bore; and
(c) allowing said epoxy composition to harden.

14. The method of claim 13 wherein said epoxide containing liquid is selected from the group of butyl glycidyl ether, aliphatic epoxy esters, the diglycidyl ether of 1,4-butanediol, the diglycidyl ether of neopentyl glycol and the diglycidyl ether of cyclohexane dimethanol.

15. The method of claim 13 wherein said hardening agent is at least one member selected from the group of aliphatic amines, aromatic amines and carboxylic acid anhydrides.

16. The method of claim 13 wherein said hardening agent is at least one member selected from the group of triethylenetetraamine, ethylenediamine, N-cocoalkyltrimethylenediamine, isophoronediamine, diethyltoluenediamine and tris (dimethylaminomethylphenol) and is present in said composition in an amount in the range of from about 20% to about 90% by weight of said composition.

17. The method of claim 13 wherein said epoxy composition further comprises a particulate filler.

18. The method of claim 13 wherein said filler is selected from the group consisting of crystalline silicas, amorphous silicas, clays, iron oxide, calcium carbonate and barite.

19. The method of claim 13 wherein said epoxy composition further comprises:
an effective amount of a foaming agent; and
an effective amount of a foam stabilizer.

20. The method of claim 13 wherein said foaming agent is selected from the group of a foaming agent comprising an alcohol ether sulfate, a foaming agent comprising the sodium salt of an alpha-olefinic sulfonic acid and a foaming agent comprising N-coco-1,3-diaminopropane and is present in an amount in the range of from about 1% to about 5% by weight of said epoxy composition.

21. The method of claim 13 wherein said foam stabilizer is cocoamidopropylbetaine present in an amount in the range of from about 0.5% to about 3% by weight of said epoxy composition.

22. The method of claim 13 wherein said compressible gas is selected from the group of air and nitrogen.

23. The method of claim 19 wherein said epoxy composition further comprises water and an epoxy resin selected from the group of the condensation products of epichlorohydrin and bisphenol A and epoxidized bisphenol A novalac resin.

24. An improved method of sealing a string of pipe in a well bore whereby the sealant can withstand the effects of contact with corrosive fluids and pipe movements comprising the steps of:
(a) preparing a foamed hardenable epoxy sealing composition which hardens into a solid mass having flexibility and resiliency comprising water, an epoxy resin, a hardening agent and a compressible gas;
(b) placing said epoxy composition into the annulus between said string of pipe and the walls of said well bore; and
(c) allowing said epoxy composition to harden.

25. The method of claim 24 wherein said epoxy resin is selected from the group of epoxy resin selected from the group of the condensation products of epichlorohydrin and bisphenol A and an epoxidized bisphenol A novalac resin.

26. The method of claim 24 wherein said hardening agent is at least one member selected from the group of aliphatic amines, aromatic amines and carboxylic acid anhydrides.

27. The method of claim 24 wherein said hardening agent is at least one member selected from the group of triethylenetetraamine, ethylenediamine, N-cocoalykyltrimethylenediamine, isophoronediamine, diethyltoluenediamine and tris (dimethylaminomethylphenol) and is present in said composition in an amount in the range of from about 20% to about 90% by weight of said composition.

28. The method of claim 24 wherein said compressible gas is selected from the group of air and nitrogen.

29. The method of claim 24 wherein said epoxy composition further comprises an epoxide containing liquid selected from the group of butyl glycidyl ether, aliphatic epoxy esters, the diglycidyl ether of 1,4-butanediol, diglycidyl ether of neopentyl glycol and diglycidyl ether of cyclohexane dimethanol present in an amount in the range of from about 10% to about 90% by weight of epoxy resin in said composition.

30. The method of claim 24 wherein said composition further comprises a particulate filler.

31. The method of claim 30 wherein said filler is selected from the group consisting of crystalline silicas, amorphous silicas, clays, iron oxide, calcium carbonate and barite.

32. The method of claim 24 wherein said epoxy composition further comprises:

an effective amount of a foaming agent; and an effective amount of a foam stabilizer.

33. The method of claim 32 wherein said foaming agent is selected from the group of a foaming agent comprising an alcohol ether sulfate, a foaming agent comprising the sodium salt of alpha-olefinic sulfonic acid and a foaming agent comprising N-coco-1,3-diaminopropane and is present in an amount in the range of from about 1% to about 5% by weight of water in said composition.

34. The method of claim 32 wherein said foam stabilizer is cocoamidopropylbetaine and is present in an amount in the range of from about 0.5% to about 3% by weight of water in said composition.

* * * * *